Aug. 27, 1935.  P. RUB, JR  2,012,639
TRAILER HITCH
Filed Oct. 12, 1934
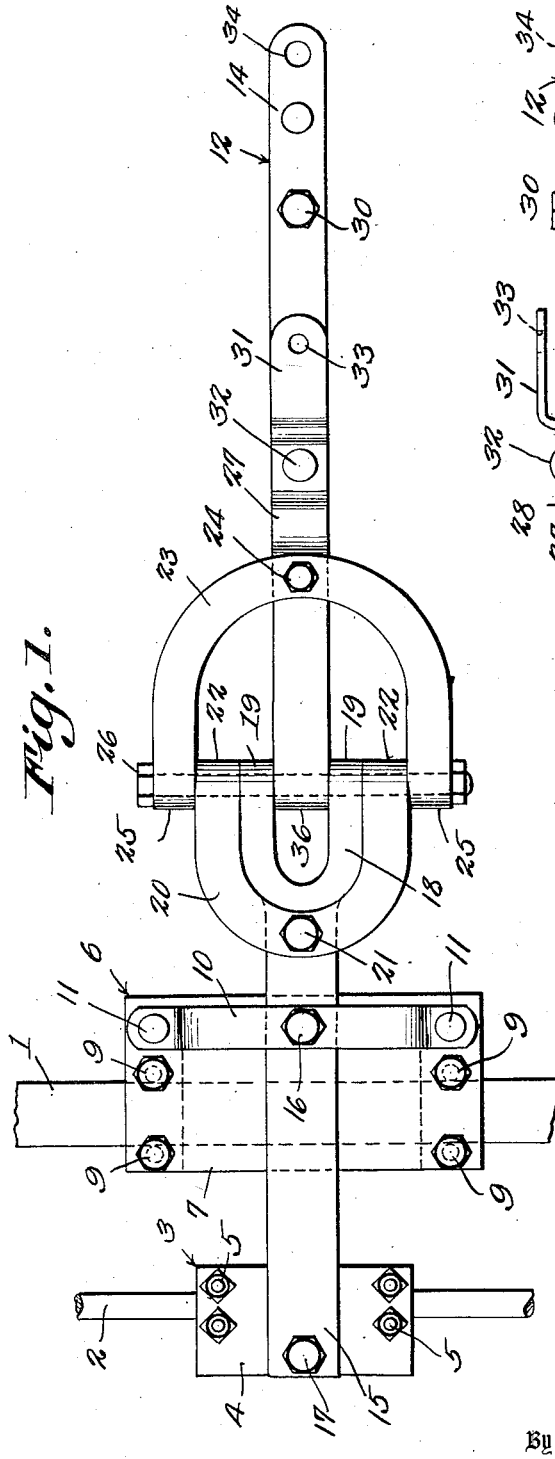
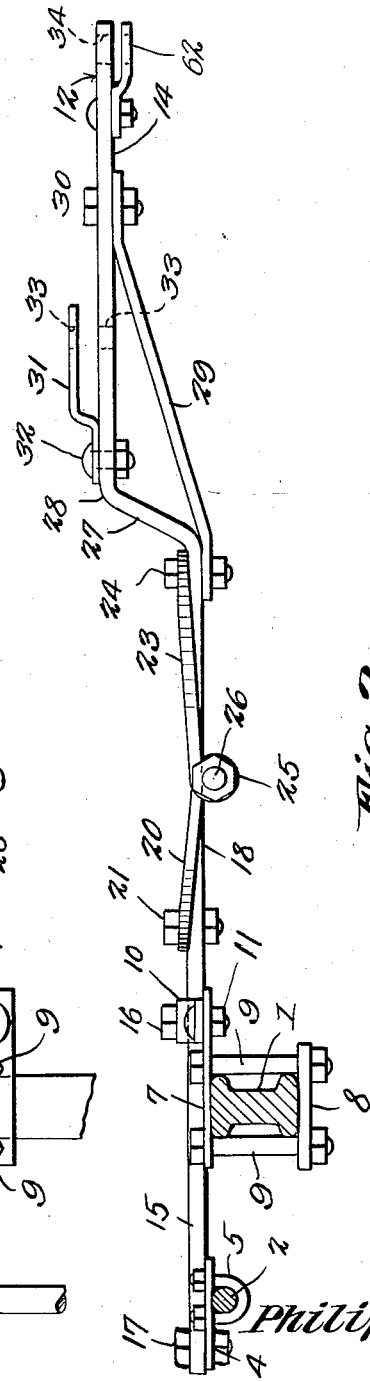
Philip Rub Jr.
Inventor
By C.A. Snow & Co.
Attorneys.

Patented Aug. 27, 1935

2,012,639

UNITED STATES PATENT OFFICE 2,012,639

TRAILER HITCH

Philip Rub, Jr., Wishek, N. Dak.

Application October 12, 1934, Serial No. 748,118

1 Claim. (Cl. 280—33.55)

This invention aims to provide novel means for attaching a trailer to an automobile, the construction being such that as the auto turns laterally, a longitudinal movement will be imparted to the radius rod of the trailer, so that the wheels of the trailer will be turned laterally to aid in rounding a curve.

A further object of the invention is to provide novel means for connecting together the forward and rear members of the lever.

Another object of the invention is to supply a device of the class described provided with strong and novel means whereby the parts of the lever may have relative hinged movement with respect to each other.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows in top plan, a device constructed in accordance with the invention, parts being broken away;

Fig. 2 is a side elevation with parts in section.

The numeral 1 designates the front axle of a trailer. The numeral 2 marks the radius rod of the trailer, the radius rod being connected to the front wheels of the trailer, in a well-known manner, to impart lateral inclination to the forward wheels of the trailer.

A first anchor is provided, and is denoted generally by the numeral 3. The anchor 3 comprises a plate 4 located on top of the radius rod 2, and U-bolts 5, extended around the radius rod 2 and mounted at their upper ends in the plate 4 of the anchor 3.

The device comprises a second anchor which is denoted generally by the numeral 6. The anchor 6 comprises a plate or bracket 7 located on top of the forward axle 1 of the trailer, and a plate 8 is located underneath the forward axle, the plates 7 and 8 being connected by securing elements 9, such as bolts, the forward or front axle 1 of the trailer fitting closely between the bolts 9, as Fig. 2 will show. On the plate 7 of the second anchor 6, near to the forward edge thereof is located a vertically offset bracket 10. The ends of the bracket 10 are connected to the plate 7 by securing devices 11 of any desired construction.

The numeral 12 marks a lever, which is a composite structure. The lever 12 comprises a forward member 14 and a rear member 15. The rear member 15 of the lever 12 extends under the bracket 10, between the bracket 10 and the plate 7. A vertical fulcrum element, such as a bolt 16, connects the intermediate portion of the rear member 15 of the lever 12 with the bracket 10 and with the plate 7. The rear end of the rear member 15 of the lever 12 is connected to the plate 4 of the anchor 3 on the radius rod 2 by a pivot element 17.

At its forward end, the rear member 15 of the lever 12 is supplied with a fork 18. There are sockets 19 on the forward extremities of the fork 18. The forward member 14 of the lever 12 is supplied on its rear end with a socket 36, fitting closely between the sockets 19 of the fork 18.

The numeral 20 designates a U-shaped rear brace. The intermediate portion of the brace 20 is disposed on top of the rear member 15 of the lever 12, in advance of the anchor 6. The side arms of the rear brace 20 slant downwardly and forwardly, so that sockets 22 on the forward extremities of the brace 20 are brought in line with the sockets 19 on the fork 18 of the rear member 15 of the lever 12. The intermediate portion of the brace 20 is connected by a securing device 21 to the rear member 15 of the lever 12. The numeral 23 designates a U-shaped forward brace. The intermediate portion of the forward brace 23 is located on top of the forward member 14 of the lever 12. At its rear end, the brace 23 has sockets 25. The side arms of the member 23 slant downwardly and rearwardly, so that the sockets 25 are brought into line with the sockets 22 on the brace 20. A securing device 24 connects the intermediate portion of the brace 23 with the forward member 14 of the lever 12. A hinge member 26, such as a bolt, extends through the sockets 25, 22, 19 and 36, and, thus, a hinge connection between the members 14 and 15 of the lever 12 is provided, the construction being such that the parts 14 and 15 can have vertical swinging movement with respect to each other. The parts 23—20—18—26 form a secure and strong hinge connection between the parts 14 and 15 of the lever 12.

Intermediate its ends, the forward member 14 of the lever 12 is offset, as shown at 27, to form an angle 28. The forward part of the member 14 is located at a higher elevation than the rear part thereof. Across the angle 28 extends a brace 29. The forward end of the brace 29 is connected to the member 14 of the lever 12 by a securing device 30. The rear end of the brace 29 is connected to the hind part of the member 14 of the lever 12, and to the brace 23, by the securing device 24. An offset bracket 31 is mounted on the forward part of the member 14, slightly in advance of the angle shown at 28 and is connected to the forward part of the member 14 by a securing element 32. The bracket 31 and the forward part of the member 14 are supplied with vertically alined holes 33. The bracket 31 is used to carry an evener (not shown), should it be desired to pull the trailer by horse power. There is an opening 34 in the forward end of the part 14 of the lever 12, to be used in conjunction with an underlying bracket 62, for attaching the device to any convenient part of the towing auto.

In practical operation, the forward member 14 of the lever 12 is attached to the auto or other vehicle which is to do the towing. As the vehicle turns laterally, the lever 12 swings laterally or horizontally on its fulcrum 16, and a longitudinal movement is imparted to the radius rod 2, the wheels (not shown) of the trailer being inclined laterally, accordingly. Moreover, owing to the presence of the hinge member 26 and associated parts, the lever 12 can yield or swing vertically, intermediate its ends, the parts 14 and 15 having relative vertical movement with respect to each other, on the hinge member 26. This facilitates the drawing of the trailer over rough or uneven ground.

The device is simple in construction and is capable of being attached to any sort of car or to any properly constructed trailer.

Having thus described the invention, what is claimed is:

In a device of the class described, a lever comprising a straight rear member provided at its forward end with a fork having sockets, the lever including a forward member provided at its rear end with a socket located between the sockets of the fork, a rear U-shaped brace secured in its intermediate portion to the rear member of the lever, the side arms of the brace being located outwardly of the fork and having sockets, a forward U-shaped brace provided at its rear end with sockets located outwardly of the sockets of the rear brace, means for securing the forward brace to the forward member of the lever, a hinge element extending through all of the sockets, a bracket, means for securing the bracket to a vehicle axle, means for fulcruming the rear member of the lever on the bracket at a point in front of the axle, and means on the rear end of the rear member of the lever for connecting the rear member to a radius rod, directly and pivotally, at a point to the rear of the bracket and the axle that carries it.

PHILIP RUB, Jr.